United States Patent [19]

Gramm

[11] 4,058,109
[45] Nov. 15, 1977

[54] SOLAR HEATING AND INSULATING APPARATUS

[75] Inventor: Ronald J. Gramm, Pittsburgh, Pa.

[73] Assignee: Sunwall Incorporated, Pittsburgh, Pa.

[21] Appl. No.: 684,409

[22] Filed: May 7, 1976

[51] Int. Cl.² .............................................. F24J 3/02
[52] U.S. Cl. ...................................... 126/270; 165/40
[58] Field of Search ............... 126/270, 271; 237/1 A; 52/198, 202, 203, 208, 573; 165/40, 53, 106, DIG. 5, DIG. 6, DIG. 7

[56] References Cited

U.S. PATENT DOCUMENTS

| 2,553,073 | 5/1951 | Barnett | 126/271 |
| 3,563,305 | 2/1971 | Hay | 165/53 |
| 3,875,925 | 4/1975 | Johnston | 126/270 |

Primary Examiner—Kenneth W. Sprague
Assistant Examiner—James C. Yeung
Attorney, Agent, or Firm—Parmelee, Miller, Welsh & Kratz

[57] ABSTRACT

A combined solar heating and insulating apparatus for use on existing buildings or in new construction. The apparatus is inexpensive to manufacture and provides for auxiliary solar heating during the day and insulation during the night, both of which result in a savings in fuel and increased efficiency of the standard heating system of the building. The apparatus takes the form of panels which can be affixed to existing vertical southern walls with little or no modification, thus allowing for the use of solar energy without expensive physical modifications to the building.

7 Claims, 5 Drawing Figures

SOLAR HEATING AND INSULATING APPARATUS

BACKGROUND OF THE INVENTION

1. Field of the Invention

This invention relates generally to apparatus for solar heating, and more particularly to solar heating panels which can be affixed to existing walls and which also serve as building insulation.

2. Prior Art

In recent years, the expense and environmental damage which are associated with the use of fossil fuels have led to increased efforts in the direction of the use of solar energy. Typically, this has resulted in designs utilizing walls of solar panels tilted at a particular angle toward the southern sun and comprised of complex combinations of heat absorbers, pipes or other heat transmitting equipment, and means for circulating the heat into the building. The complexity of such structures has resulted in considerable expense in construction of the equipment, and has also normally necessitated the incorporation of the solar heating equipment into the design of the building prior to construction. The expense and complexity associated with such structures has led to attempts to design devices which can be attached to existing structures and use solar energy to heat or assist in heating the structures. Examples of such devices can be seen in U.S. Pat. Nos. 2,931,578 and 3,875,925.

The present invention is a device which can be readily attached to an existing structure without extensive modification. It provides means for use of solar energy to assist in heating the building during the day, and also provides for insulation of the building during the night so as to prevent heat loss and increase the efficiency of the standard heating system of the building. The extra heat obtained during the day and the heat loss prevented during the night both result in a savings in fuel for the building heating system.

SUMMARY OF THE INVENTION

The present invention is a solar heating apparatus for attachment to the wall of a building, including a transparent panel spaced from the wall and an enclosure attached to the transparent panel sealing the space between the panel and the wall. If desired, the transparent panel and the enclosure may be integrally formed, such as by molding from plastic or similar material. A heat absorber of insulating material is spaced between the transparent panel and the wall such that a first air space is formed between the transparent panel and the heat absorber, and a second air space is formed between the heat absorber and the wall, with the first and second air spaces being in communication through openings above and below the heat absorber. The insulating material is preferably a foamed plastic, such as polyurethane or glass or a glassy ceramic material. Heat sensing damper means are provided for closing the openings between the first and second air spaces in response to changes in temperature, thus preventing air circulation around the heat absorber during times when the sun is not heating the absorber, and causing the entire apparatus to serve as insulation to prevent heat loss from the building.

DESCRIPTION OF THE PREFERRED EMBODIMENT

Figure 2:
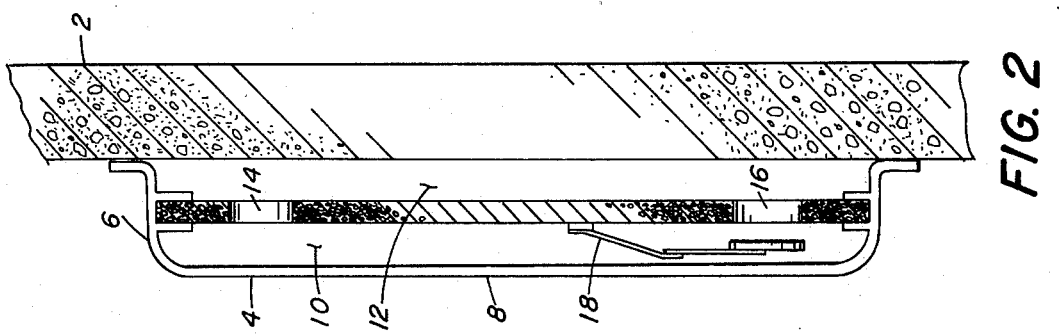
FIG. 2 is a side section view of another embodiment of the present invention.
Figure 1:
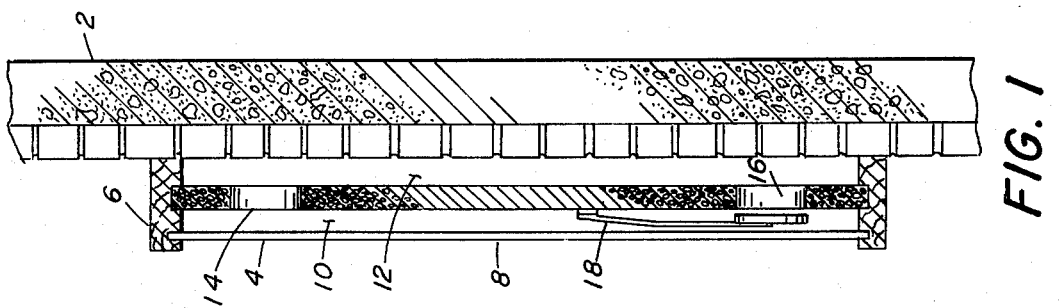
FIG. 1 is a side section view of one embodiment of the present invention.
Figure 5:
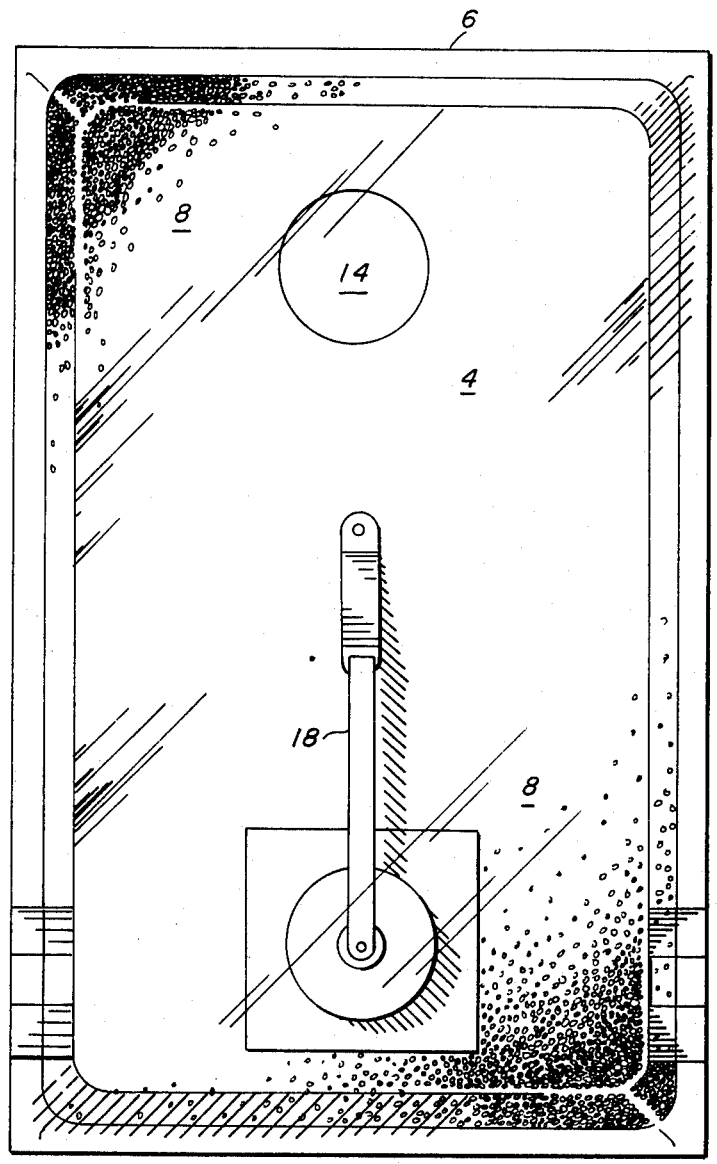
FIG. 5 is a front elevation view of the apparatus of the present invention.

Referring now to the drawings, the solar heating apparatus of the present invention is attached to a wall 2 which is preferably formed of brick or other masonry. In the embodiment shown in FIG. 1, a transparent panel 4 is spaced from the wall by mounting it in an enclosure 6, which may be either integral with the transparent panel as shown in FIG. 2, or constructed as a separate unit, as shown in FIG. 1. The enclosure 6 seals the space between the panel 4 and the wall 2 thus creating a dead air space. A heat absorber 8 formed of an insulating material is located between the transparent panel 4 and the wall 2, and is so situated as to form a first air space 10 between the transparent panel 4 and the heat absorber 8, and a second air space 12 between the heat absorber 8 and the wall 2.

The absorber 8 is preferably formed from a blackened cellular material such as polyurethane or foamed ceramic or glass. Black urea formaldehyde foam and other similar black closed-cell insulating materials may also be used for the absorber. Various transparent materials may be used for the transparent panel 4, but a preferred material is cellulose acetate butyrate, such as the material known under the trademark Uvex.

In the preferred embodiment the transparent panel 4 and the enclosure 6 are formed as one molded piece of Uvex or similar material. The enclosure 6 spaces the panel 4 from the wall a distance of approximately six inches. The absorber is mounted to the enclosure in such a manner as to space the absorber 8 between the panel 4 and the wall 2. An upper opening 14 and a lower opening 16 are provided through the absorber 8 so as to provide air circulation between the first air space 10 and the second air space 12.

In operation the rays of the sun pass through the transparent panel 4 and strike the surface of the absorber 8. The heat caused by the absorption of the solar rays into the blackened absorber 8 is passed into the air in the first air space 10 causing that air to be heated and to rise. Since the air in the second air space 12 is cooler than the air in the first air space 10 convection currents are created which cause the air to pass from the first air space 10 to the second air space 12 through the upper opening 14 in the absorber 8, and to pass from the second air space 12 to the first air space 10 through the lower opening 16 in the absorber 8. In this manner a constant flow of air warmed by the absorber 8 is passed through the second air space 12 and over the surface of the wall 2. The wall 2 is heated by this air in the second air space 12, and this heat is passed into the building through the wall.

Figure 4:
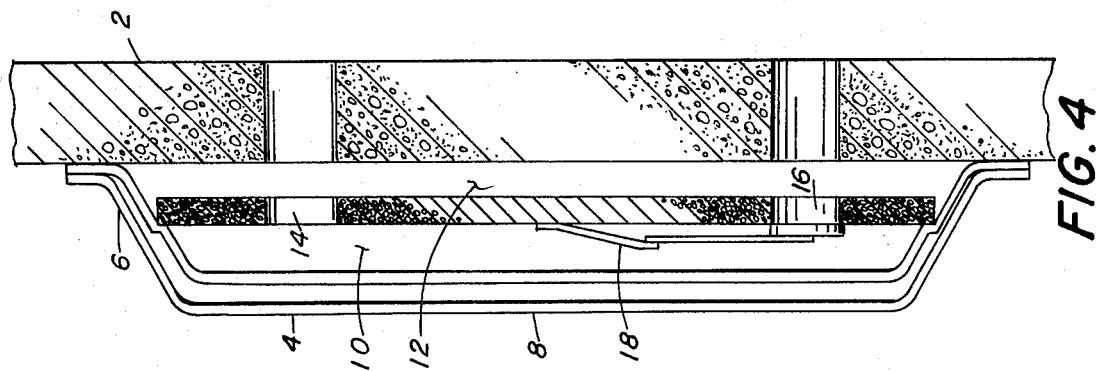
FIG. 4 is a side section view of the present invention showing the damper in the closed position.
Figure 3:
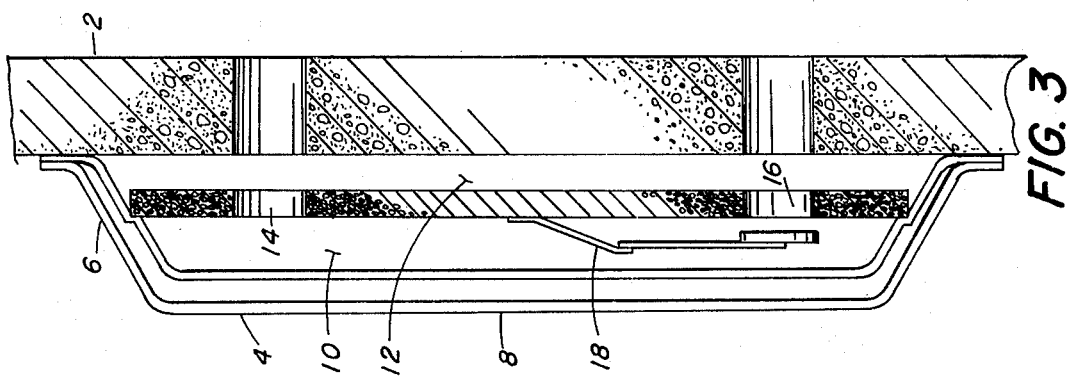
FIG. 3 is a side section view of the present invention showing the damper in the open position.

At night, or at other times when solar rays are not striking the absorber 8, the air in the first air space 10 will be cooler than that in the second air space 12 and will cause a loss of heat from the building by the convection induced by this difference. For this reason a valve means such as the bimetal damper 18 is provided over the lower opening 16 through the absorber 8. The bimetal damper 18 is constructed so that a slight spring pressure is exerted so as to close the lower opening 16 when the solar rays are not striking the damper 18, as shown in FIG. 3. When the solar rays do strike the damper 18, the bimetal portion is heated and draws the damper 18 away from the lower opening 16, as shown in FIG. 4. This allows the air to circulate from the second air space 12 into the first air space 10 as described above. When the solar rays are no longer striking the bimetal strip the damper 18 will close the lower opening 16 and loss of heat from the building will be minimized.

An alternative embodiment of the present invention is shown in FIG. 3 wherein openings have been provided through the wall 2. In this embodiment the air heated in the first air space 10 passes through the upper opening 14 in the absorber 8 and through the upper opening in the wall 2 and directly into the building. Cool air is drawn from the building through the lower opening in the wall 2 and through the lower opening 16 in the absorber 8 into the first air space 10 where it is heated. In this embodiment, as in the previous embodiment, the bimetal damper 18 closes the lower opening 16 through the absorber 8 at night and thus prevents heat loss from the building during this time.

The apparatus herein disclosed also serves to insulate the building to which it is attached at times when the sun is not causing heat to be produced by the apparatus. With the damper 18 closed the apparatus provides an additional dead air space on the wall of the building which prevents loss of heat from the building at night or during the winter. The transparent panel 4 is preferably formed from two parallel sheets of transparent material, with an air space between the two sheets. This air space, which is preferably about one inch in thickness, adds to the insulating value of the apparatus.

There has been disclosed a simple and inexpensive apparatus for providing solar heat to assist the usual building heating system, and which also serves as insulation so as to prevent heat loss from the building.

I claim:

1. A solar heating apparatus for attachment to a wall of a building, comprising:
   a transparent panel spaced from the wall;
   an enclosure attached to the transparent panel, sealing the space between the panel and the wall;
   a heat absorber of closed-cell insulating material spaced between the transparent panel and the wall, such that a first air space is formed between the transparent panel and the heat absorber, and a second air space is formed between the heat absorber and the wall, said first and second air spaces being in communication through openings above and below the heat absorber; and
   heat sensing damper means for closing at least one of the openings between the first and second air spaces in response to changes in temperature.

2. A solar heating apparatus as described in claim 1, wherein the insulating material is a foamed plastic.

3. A solar heating apparatus as described in claim 2, wherein the foamed plastic is polyurethane.

4. A solar heating apparatus as described in claim 1, wherein the insulating material is glass.

5. A solar heating apparatus as described in claim 1, wherein the insulating material is ceramic.

6. A solar heating apparatus as described in claim 1, wherein the transparent panel comprises two parallel, spaced sheets of transparent material.

7. A solar heating apparatus as described in claim 1, wherein the transparent panel and the enclosure are integrally formed.

* * * * *